(12) United States Patent
Sartin et al.

(10) Patent No.: US 8,366,167 B2
(45) Date of Patent: Feb. 5, 2013

(54) TRANSPORTABLE EMERGENCY RESPONSE STATION FOR TREATMENT OR TRANSPORTATION OF PERSONS ON STRETCHERS

(75) Inventors: Edward Lewis Sartin, Greensboro, NC (US); Edward Austin Sartin, Graham, NC (US)

(73) Assignee: Aces Holdings, LLC, Archdale, NC (US)

( * ) Notice: Subject to any disclaimer, the term of this patent is extended or adjusted under 35 U.S.C. 154(b) by 0 days.

(21) Appl. No.: 13/357,672

(22) Filed: Jan. 25, 2012

(65) Prior Publication Data

US 2012/0181807 A1    Jul. 19, 2012

Related U.S. Application Data

(63) Continuation of application No. 12/514,525, filed as application No. PCT/US2007/083757 on Nov. 6, 2007, now Pat. No. 8,104,814.

(60) Provisional application No. 60/858,532, filed on Nov. 13, 2006, provisional application No. 60/899,737, filed on Feb. 6, 2007, provisional application No. 60/936,132, filed on Jun. 18, 2007.

(51) Int. Cl.
*A61G 1/02* (2006.01)
(52) U.S. Cl. ............................ 296/24.38; 296/16; 296/19
(58) Field of Classification Search ................ 296/16, 296/18, 24.38, 178, 19; 224/543, 548; 5/626
See application file for complete search history.

(56) References Cited

U.S. PATENT DOCUMENTS

| 2,216,243 A | 10/1940 | Kreidler |
| 2,456,024 A | 12/1948 | Schofield |
| 3,358,300 A * | 12/1967 | Smith ............................... 5/9.1 |
| 4,006,500 A | 2/1977 | Bonifay |
| 4,339,146 A | 7/1982 | Lehmann |

(Continued)

FOREIGN PATENT DOCUMENTS

| FR | 2631816 A1 * | 12/1989 | ..................... 296/19 |
| JP | 2001-353185 A * | 12/2001 | |

(Continued)

OTHER PUBLICATIONS

Patent Abstracts of Japan (JP Pub No. 2002153512A; published May 28, 2002).

(Continued)

*Primary Examiner* — Jason S Morrow
(74) *Attorney, Agent, or Firm* — Womble Carlyle Sandridge & Rice, LLP

(57) ABSTRACT

The invention relates to a vehicle used in transporting or treating large numbers of victims or patients from a mass-casualty incident to or from a hospital in an evacuation situation. The typical vehicle contains a stacked stretcher system, a loading ramp system, and an oxygen system. This vehicle must have an independent energy source or must be capable of being powered by an outside energy source. The vehicle can be flexible enough to provide facilities for treatment of victims either at the site of a disaster, in route from the disaster, at any remote site, or near a healthcare facility. A variation of the vehicle contains refrigeration or freezer units and is capable of transporting or maintaining casualties until mortuary services can be obtained. Variations of the equipment include trays made of stainless steel, stretchers that can be easily cleaned and that allow for easy drainage of liquids.

39 Claims, 13 Drawing Sheets

U.S. PATENT DOCUMENTS

| | | | |
|---|---|---|---|
| 4,378,128 | A | 3/1983 | Holling et al. |
| 4,425,978 | A | 1/1984 | Star |
| 4,570,733 | A | 2/1986 | Star |
| 4,824,158 | A | 4/1989 | Peters |
| 5,178,432 | A | 1/1993 | Zeman |
| 5,372,339 | A | 12/1994 | Morgan |
| 5,383,629 | A | 1/1995 | Morgan |
| 5,490,703 | A | 2/1996 | Hewko |
| 5,497,968 | A | 3/1996 | Hewko |
| 5,509,710 | A | 4/1996 | Eavenson |
| 5,755,478 | A | 5/1998 | Kamiya |
| 5,775,758 | A | 7/1998 | Eberspacher |
| 5,779,296 | A | 7/1998 | Hewko |
| 5,813,629 | A | 9/1998 | Cabrera |
| 6,039,377 | A | 3/2000 | Eberspacher |
| 6,688,664 | B2 | 2/2004 | Sioutis |
| 6,916,056 | B2 | 7/2005 | Mitchell |
| 6,929,061 | B2 | 8/2005 | Lajeunesse |
| 7,095,210 | B2 | 8/2006 | Tamura |
| 7,111,340 | B2 | 9/2006 | Mitchell |
| 7,188,880 | B1 | 3/2007 | Frieder |
| 7,328,926 | B1 | 2/2008 | Myers |
| 7,883,133 | B2 | 2/2011 | Chinn |
| 7,931,321 | B2 | 4/2011 | Kapoor |
| 2003/0102685 | A1 | 6/2003 | Sioutis |
| 2004/0080172 | A1 | 4/2004 | Mitchell |
| 2004/0120798 | A1 | 6/2004 | Davis et al. |
| 2005/0225107 | A1 | 10/2005 | Mitchell |
| 2006/0137886 | A1 | 6/2006 | Cano |
| 2007/0075557 | A1 | 4/2007 | Frieder |
| 2007/0102946 | A1 | 5/2007 | Blackwell |
| 2008/0004663 | A1 | 1/2008 | Jorgenson |
| 2011/0089124 | A1 | 4/2011 | Chinn |

FOREIGN PATENT DOCUMENTS

| | | | |
|---|---|---|---|
| WO | WO-9927881 A1 * | 6/1999 | |
| WO | WO 2005-120896 A2 | 12/2005 | |

OTHER PUBLICATIONS

Abstract (JP Pub. No. 200469399A; published Mar. 4, 2004).

Patent Abstracts of Japan (JP Pub. No. 2007111139A; published May 10, 2007).

International Search Report and Written Opinion (PCT/US2007/083757; published May 29, 2008).

"Countering International Terrorism: The United Kingdom's Strategy," HM Government, pp. 1-38, Jul. 2006 (http://www.cabinetoffice.gov.uk/security_and_intelligence/community.aspx).

"Giant Medgadget: Mercedes Bus-Based Ambulance," medGadget, pp. 1-5, (May 18, 2006) (http://medgadget.com/archives/2006/05/giant medgadget 1.html, as of Sep. 8, 2008).

Response Systems, LLC—Disaster Preparation, web pages pp. 1-4 (Sep. 2, 2009); web pages pp. 1-12 (Apr. 22, 2008).

Letter and enclosures dated Feb. 15, 2012, from Art MacCord of MacCord Mason to Robert D. Mason, Jr., of Womble Carlyle Sandridge & Rice, regarding ACES Holdings LLC's lawsuit against Matthews Specialty Vehicles, Inc. for alleged patent infringement of U.S. Patent No. 8,104,814, 3 pgs.

Complaint and exhibit regarding *ACES Holdings, LLC* v. *Matthews Specialty Vehicles, Inc.*, The United States District Court for the Middle District of North Carolina, Case #: 1:12-cv-00103, filed Jan. 31, 2012, 29 pgs.

\* cited by examiner

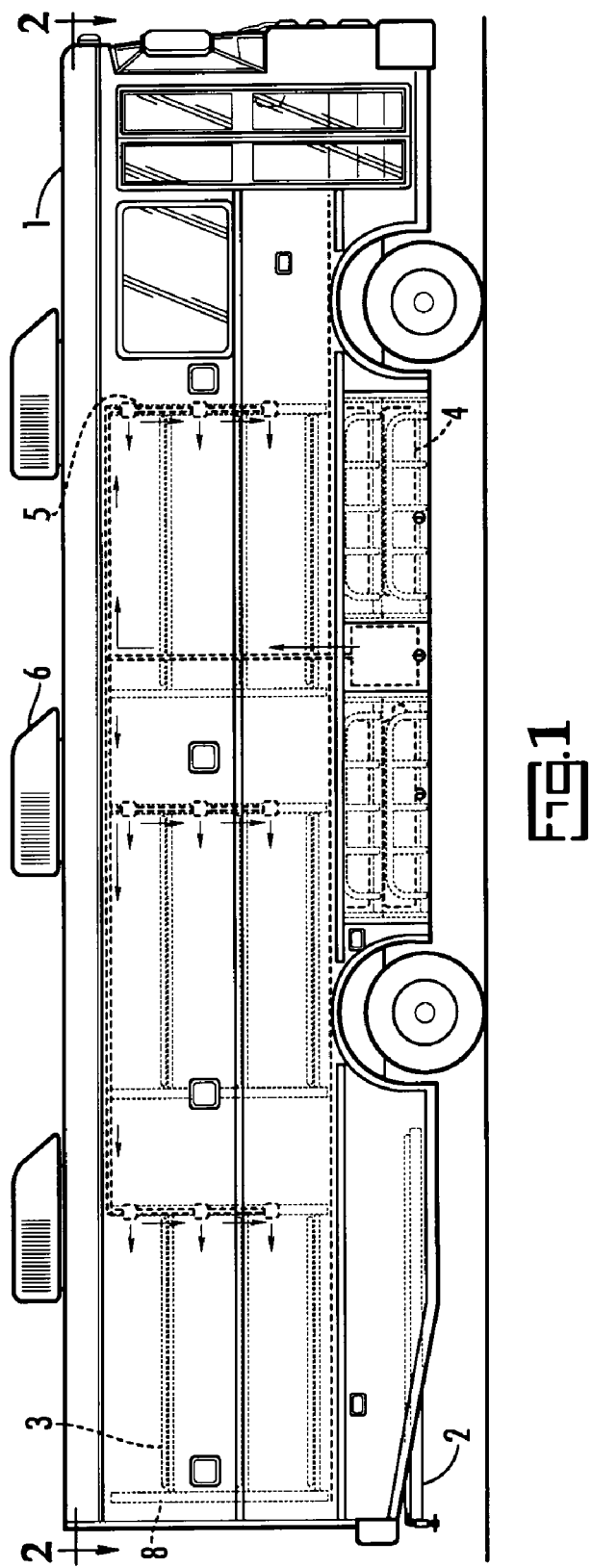

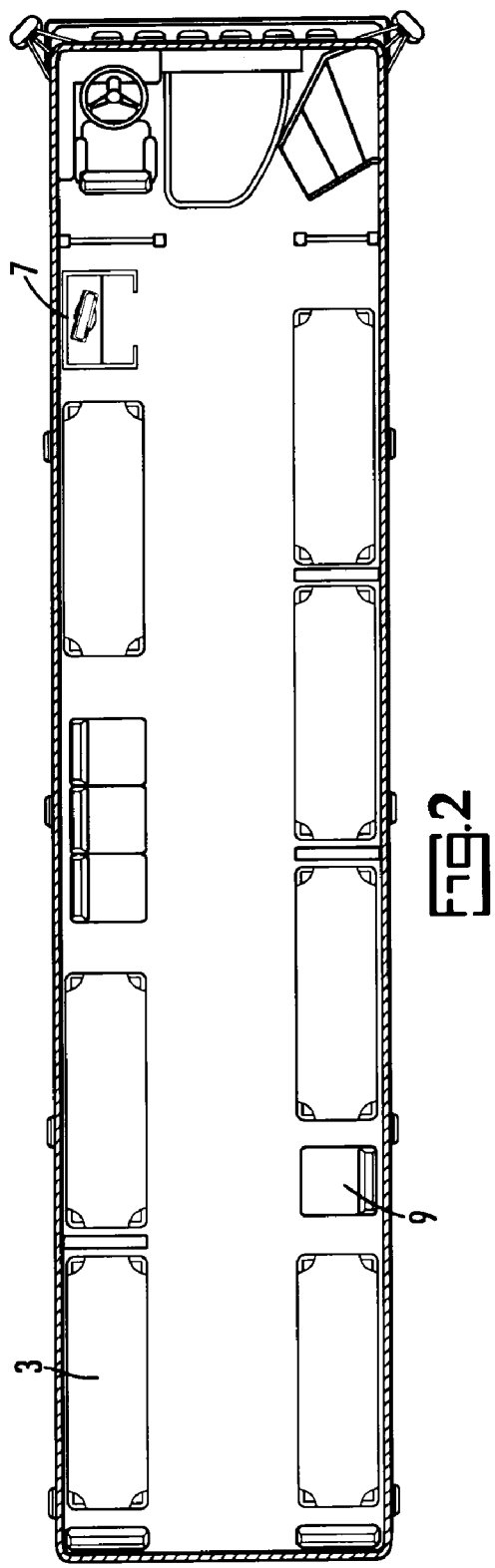

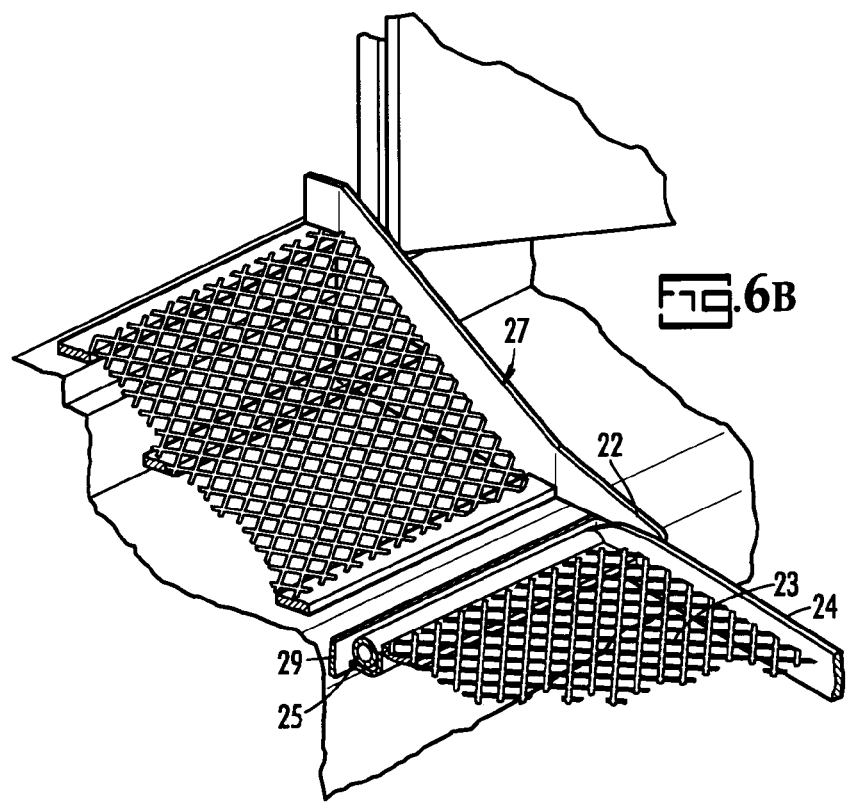
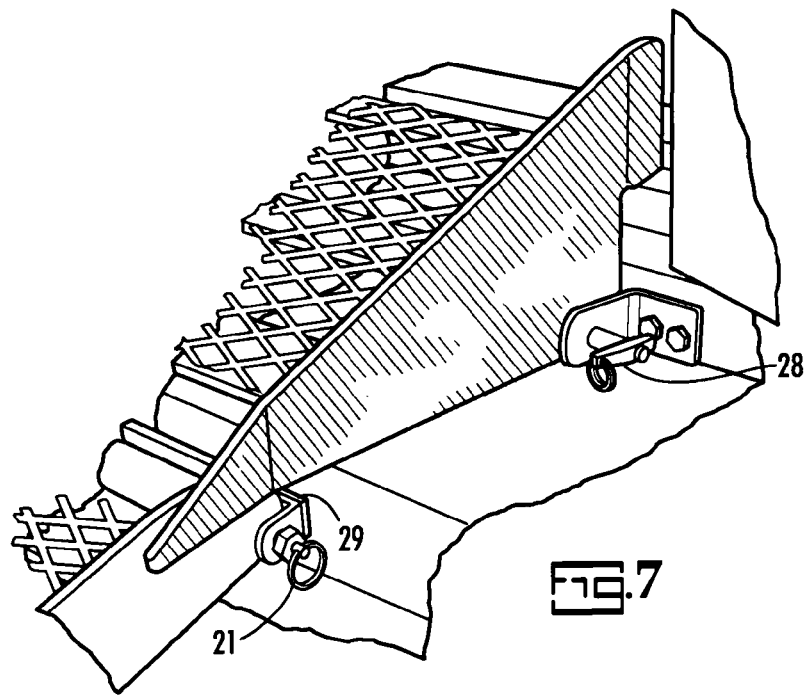

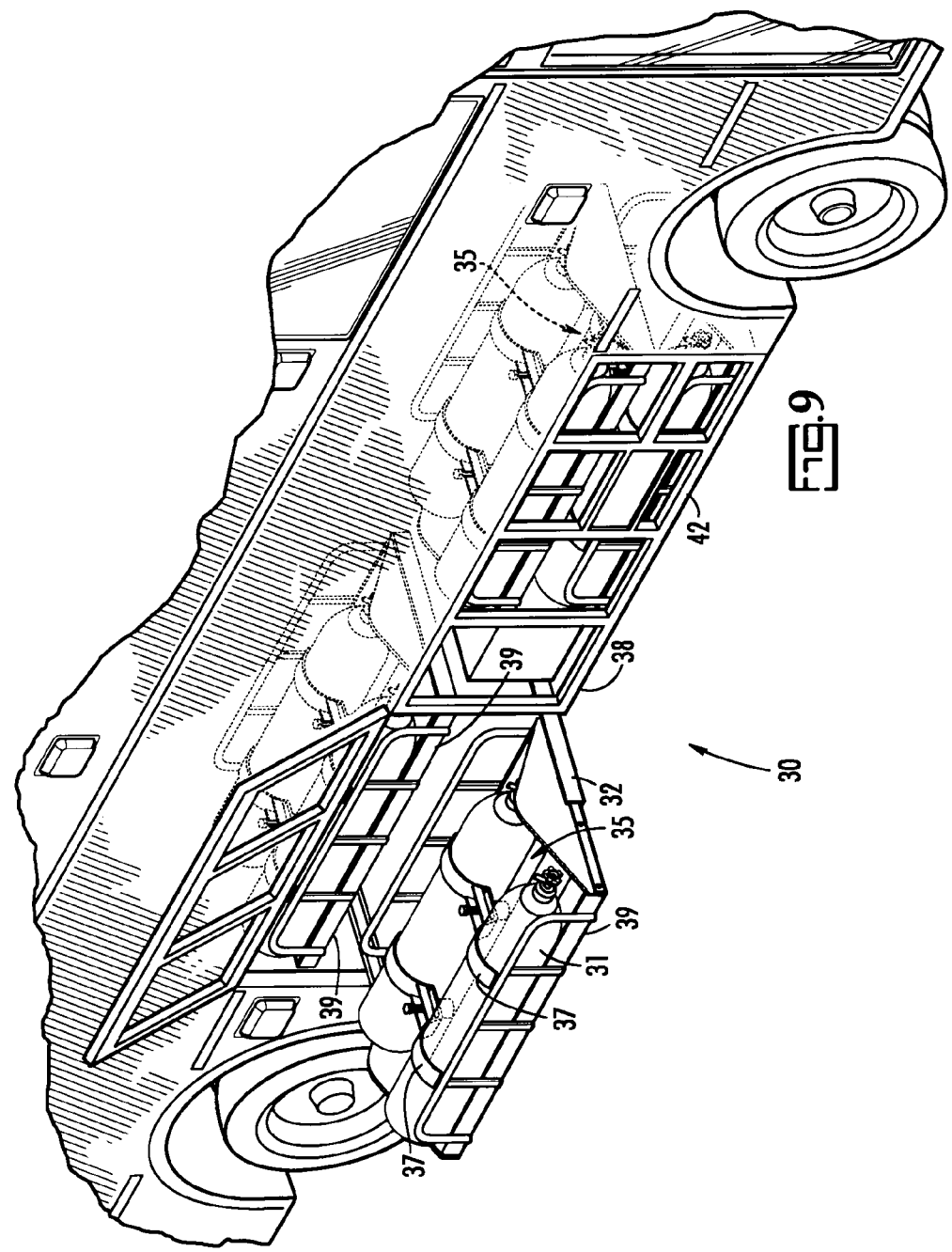

TRANSPORTABLE EMERGENCY RESPONSE STATION FOR TREATMENT OR TRANSPORTATION OF PERSONS ON STRETCHERS

This patent application is a continuation of U.S. patent application Ser. No. 12/514,525, filed May 12, 2009, now U.S. Pat. No. 8,104,814, which is a national stage of International Application No. PCT/U.S. 2007/083757, filed Nov. 6, 2007, which claims the benefit of U.S. Provisional Patent Application No. 60/858,532, filed Nov. 13, 2006, U.S. Provisional Patent Application No. 60/899,737, filed Feb. 6, 2007, and U.S. Provisional Patent Application No. 60/936,132, filed Jun. 18, 2007, all of which are incorporated in their entirety herein.

BACKGROUND

Ambulances are able to carry only a very small number of patients (generally only one or two), making it extremely complex to transport all the victims or patients that have treatment or evacuation needs when a mass casualty event or disaster occurs. Currently, when such an event occurs, many ambulances are called to transport the victims, and, given the limited number of ambulances generally available within a given geographic area, the total number of patients that can be transported is also greatly limited. Furthermore, with so many victims needing transportation from one mass casualty event, if all conventional ambulances are used for transport, people in other coverage areas might suffer because ambulances are not available to handle other emergencies.

A similar problem is encountered when an evacuation of a large number of patients is required. For example, the ability to relocate the patients from a hospital or a nursing home that may be in the path of an approaching hurricane also would be limited by the availability and number of ambulances available.

Similarly, if there is a need to treat a large number of victims at a given location, the only option available now is to transport the victims to a remote site for treatment, and movement of the large number of victims is similarly impacted by the limited number of ambulances. Alternatively, a tent-like treatment facility might be set up, but the suitability of such a system would depend on the disaster conditions (e.g., a tent would not hold up well during windy conditions; climate extremes might be difficult to control; once patients are stabilized in the tent-like structure, they would still need to be transported to a hospital or other facility for extended care).

Other ambulance-type vehicles, such as those used in the military, use J-type hooks or loop-type straps for holding stretchers, and loading a stretcher onto such a J-hook type holder or loop-type straps requires up to six people to maneuver the stretcher into storage position.

Furthermore, if there is a need to transport a large number of casualties, multiple ambulances or hearses would be needed.

SUMMARY OF THE INVENTION

The subject of the invention relates to a vehicle used in transporting or treating large numbers of victims or patients (often 20 or more) from a mass-casualty incident, such as a terrorist attack or a major medical emergency (e.g., a pandemic or major accident), to a hospital or from a hospital in an evacuation situation, such as prior to a natural disaster (e.g., a hurricane). The vehicle can accommodate multiple victims in a series of stacked stretchers. In addition, the stretchers are fixed in position and the victims are securely attached to the stretchers during transport to protect the victims. Furthermore, the victims are easily and quickly loaded onto or off from the stretchers system.

Given the large number of victims carried, the vehicle has a ramp for loading and unloading the victims. In addition, a system for providing oxygen to a large number of patients can be provided.

Furthermore, the vehicle can be flexible enough to provide facilities for treatment of victims either at the site of a disaster, in route from the disaster or at any remote site or near a healthcare facility (e.g., adjacent to a hospital when there are insufficient empty beds in the hospital to accommodate the patients). This means that the vehicle must have an independent energy source or the vehicle must be capable of being powered by an outside energy source.

In addition, a variation of the vehicle is capable of transporting casualties from disaster or maintaining the casualties until mortuary services can be obtained, and these vehicles contain refrigeration or freezer units.

Given the variety of the above requirements, special variations of equipment may be utilized, such as trays made of stainless steel or other materials, stretchers or similar surfaces that can be easily cleaned or that allow for easy drainage of bodily liquids that might accumulate on the surfaces or easy drainage of cleaning products that might be used to clean the surfaces.

BRIEF DESCRIPTION OF THE FIGURES

FIG. 1 shows a side view of a typical emergency response vehicle.

FIG. 2 shows a cut-away top view of the emergency response vehicle.

FIG. 6B shows detail of the threshold ramp assembly, the ramp receiver assembly and a portion of the ramp assembly.

FIG. 7 shows further details of the attached ramp, the ramp threshold assembly and the locking system of each.

FIG. 9 shows the components of the oxygen storage system used in the emergency response vehicle.

DETAILED DESCRIPTION OF THE INVENTION

Figure 3A:
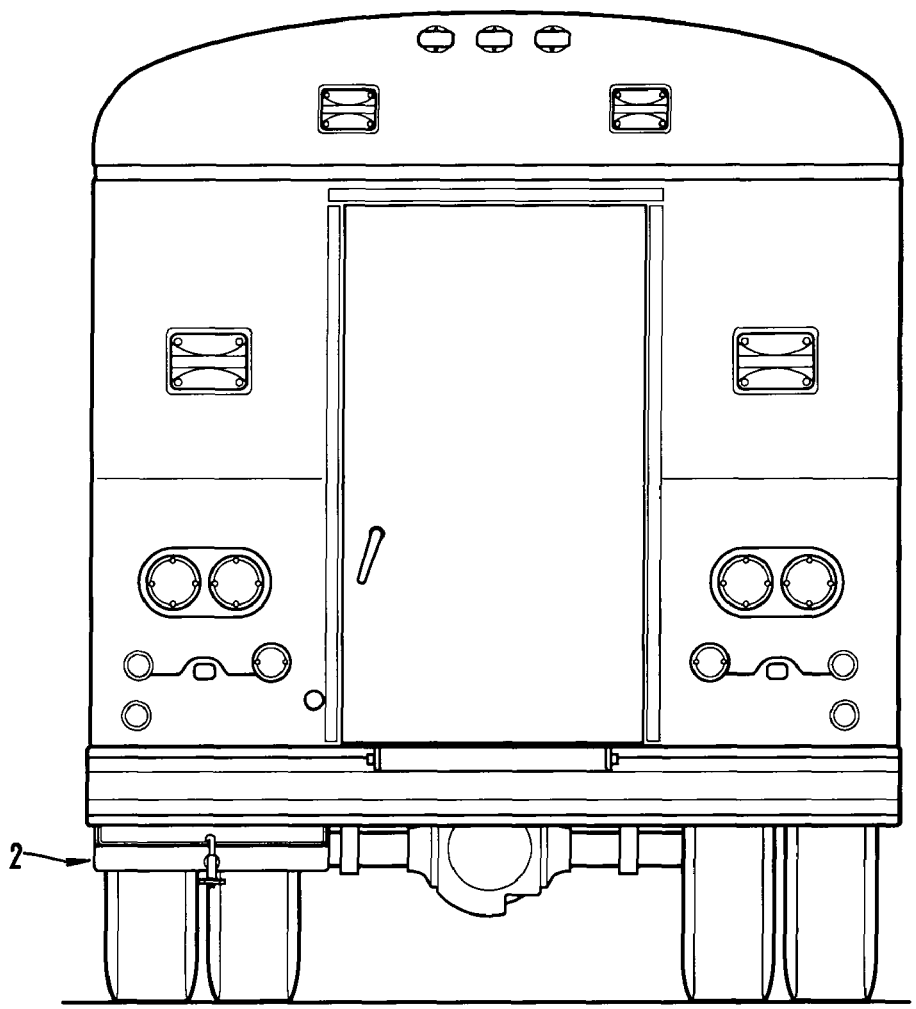
FIGS. 3A and 3B show rear views of the vehicle, with the ramp stored under the vehicle (FIG. 3A) and extended (FIG. 3B).

The invention relates to a vehicle used in transporting or treating large numbers of victims or patients from a mass-casualty incident. Such a vehicle might be needed to respond to numerous types of emergency events, such as natural disasters (e.g., hurricanes, floods, earthquakes, pandemics), breaches of homeland security (e.g., terrorist attacks), major accidents (e.g., train derailments, airplane accidents, bridge collapse, major highway pile-ups), and military situations (e.g., evacuation of wounded troops to or from a military hospital). In any of these emergency events, it might be necessary, for example, either:

1. to evacuate the victims from the disaster site to a hospital or other treatment facility;
2. to evacuate the patients from one treatment facility to an alternate treatment facility or to a safe area (e.g., to temporarily move patients from a hospital or nursing home that is in the path of a hurricane);
3. to set up a temporary treatment facility in a remote location;
4. to treat large numbers of patients in the vehicle when alternate treatment facilities are unavailable because of distance or over-crowding at remote treatment facilities;
5. to move the equipment in an emergency response vehicle to an existing building where treatment can be provided (e.g., establish a temporary treatment facility in a school during a natural disaster); or
6. to maintain casualties until they can be handled by a mortuary facility.

The use of the term "victim" in this disclosure should be interpreted broadly and is intended to refer, for example, to a patient who has been injured and is in need of treatment; an incapacitated patient who is undergoing treatment, care or observation at an existing hospital or other treatment facility (e.g., a nursing home); a casualty of the emergency event; or other such circumstances.

The emergency response vehicle can be a vehicle for transport on land, sea, in the air, or in any combination of these environments (e.g., a marine vehicle capable of transport in the water and on land). The land vehicle can take many forms, for example one built in a bus-type vehicle, a truck-type vehicle, a subway car or a train.

The size of the vehicle is also variable, depending on the number of victims anticipated. Given that existing ambulances typically hold only one or at most two patients, the emergency response vehicles described herein might have space for as few as approximately 3 victims and as many as 40 or more.

Given the variety of situations that might be encountered, the vehicles can be designed to have different equipment, but the minimum requirement is that the vehicle have the capability of holding multiple stretchers on stretcher receiving assemblies, generally stacked on sliding assemblies so that two, three or more are above each other. The vehicle will require a means for loading or unloading the victims, typically a ramp. In addition, the vehicle might require an oxygen storage and distribution system for providing an individually metered oxygen supply to each patient.

The vehicle may also require a temperature control system, to provide heat or air conditioning for providing a reasonable environment for the victims. If the vehicle might be used for transporting or storing casualties, the temperature control system might need the capability of providing refrigeration or freezer conditions. A variation for carrying both patients requiring treatment and casualties is also possible, generally in separate compartments having separate temperature adjustments and ventilation systems.

Furthermore, the vehicle should have an independent energy source in, or attached to, the vehicle or should be capable of being powered by an outside energy source. For example, the engine on the vehicle might have the capability of charging batteries contained in the vehicle, with these batteries being able to supply the energy needs for operating the facilities for the victims. In another example, a source of electricity from outside the vehicle might be connected to the vehicle for the purpose of providing energy for operating the facilities for the victims.

Given that there might be bodily fluids that accumulate from the victims, the sliding stretcher tray assembly in which the patient rests could collect and hold those fluids from dripping on a patient in a lower position. The stretcher tray that the victims use would also likely have a drain plug and a connection system for the draining or discharge of those fluids or cleaning agents that the attendants might use. It should be noted that the term "stretcher" as used here is not limited to the typical stretcher, but it also refers to any surface on which the victim is reclining. Thus a stretcher could refer to a cloth or metal surface on which the victim is laying, a plastic-coated reclining surface, a padded surface, a mattress or any other surface that could accommodate a patient or victim.

The types of materials specified in making the components described below are merely examples, and other types of materials, such as stainless steel, aluminum, steel or other manufactured materials can also be used. If reasonable, manufactured goods made from natural products (e.g., wood) can also be used. The dimensions of the components represent an example, and the components can easily be built to larger or smaller sizes depending on the needs of the transporting agency. The components can also be varied in design, so long as adequate strength is maintained.

This application provides additional detail on other variations, such as the stretcher storage assembly and sliding mechanisms, which can be used not only in vehicles but also, particularly on a temporary basis, in buildings, and the refrigeration system that can be utilized in a mortuary version of the vehicle.

FIG. 1 shows the side view of a typical vehicle 1 that has been converted into an evacuation/triage vehicle. FIG. 2 shows the top view of the vehicle (along the cut line shown in FIG. 1). Vehicles of all sizes and dimensions can be used. The length of a vehicle used depends on the number of patients to be transported or cared for and the amount of the bus interior that is converted for medical personnel supplies and equipment. Generally the vehicle contains a ramp 2 for loading and unloading victims, stretchers 3 for holding victims, and an oxygen system, containing oxygen storage components or tanks 4 and an oxygen delivery system for large numbers of patients 5. The vehicle shown also has a heating/air conditioning/refrigeration system 6, a nursing station 7, and an attendant's seat 9. The stretcher system in the evacuation vehicle also includes tray assemblies 8.

Ramp for Loading and Unloading

One problem arises when stretchered patients are loaded or unloaded from a vehicle floor level that is above ground. The loading and unloading of large numbers of patients is hampered by the height of the floor of the vehicle that is transporting the patients. Under current conditions, medical attendants carrying stretchered patients would have to transfer those patients from one attendant to another as they load them from a ground level into the vehicle floor level thereby increasing the likelihood that a patient may be dropped. A height adjustable loading/unloading ramp allows medical attendants to enter or leave the vehicle carrying a stretchered patient up, down or across the ramp without transferring the patient to another attendant, thereby reducing the possibility of dropping the patient.

The adjustable detachable loading/unloading ramp is designed to allow loading/unloading from the ground position up to approximately 15 degrees above the floor level of the vehicle. The ramp can be manufactured from many different component materials and can be built to any size or weight capacity.

Figure 3B:
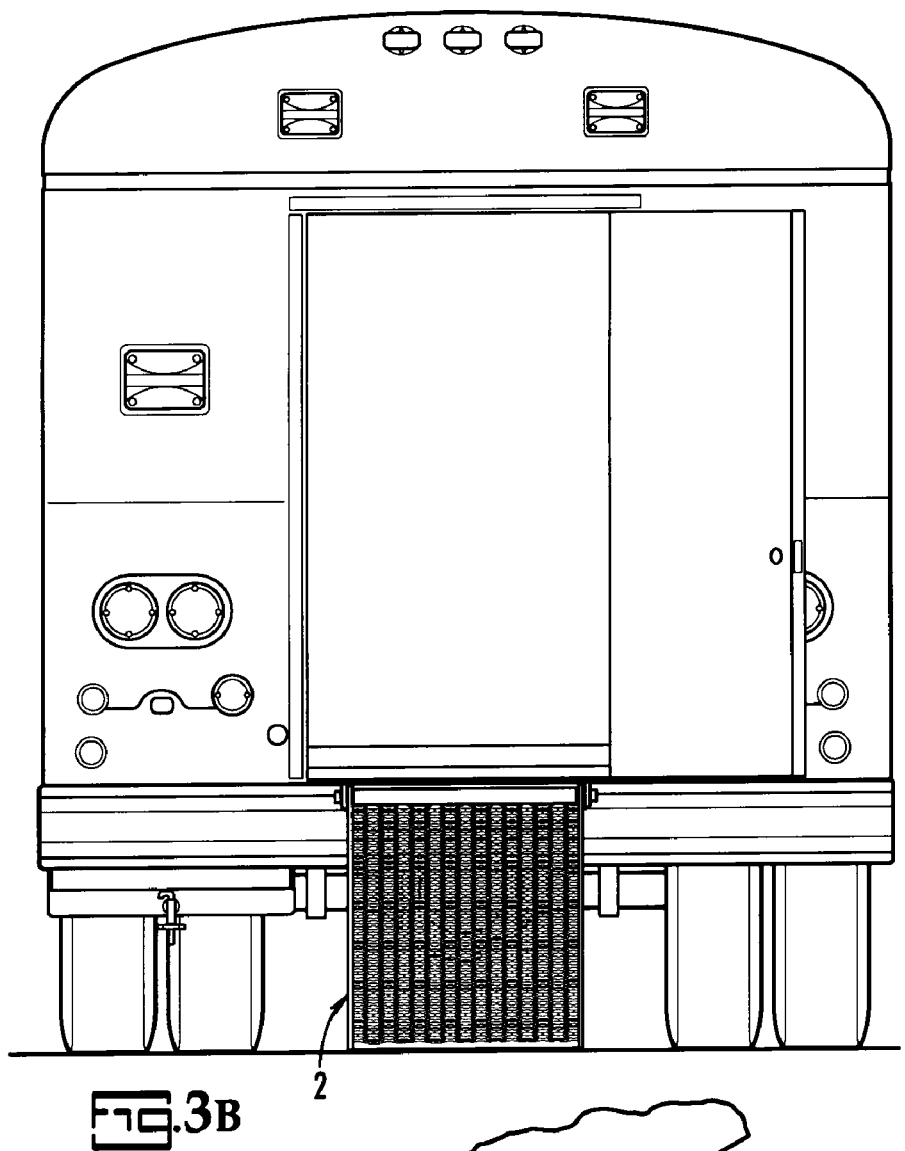

The detachable loading/unloading ramp stores under the vehicle (see FIG. 3A) and when needed is slid out and attached to the bumper or any side of the vehicle (see, for example, FIG. 3B). The vertical adjustment feature of the ramp allows patients to be loaded from the ground area up to the floor level of the vehicle or down to a vehicle which is lower than where the victims are located (i.e the ramp can be used to carry patients "uphill", "downhill" or on a level plane into the vehicle). The adjustable ramp allows the vehicle to park at a hospital loading area or onsite disaster area and, when the ramp is deployed at any angle, patients can be loaded in a very safe and fast manner. In many cases the ramp when in use will be attached to the center of the rear of the vehicle. (See FIG. 3B) However, if, for example, a rear engine vehicle is used, the location of the ramp may need to be changed. Alternatively the ramp could be attached to any side of the vehicle or to one side of the rear, if a narrow vehicle, having stretchers on only one side of the aisle, is used, or to any other reasonable position.

Figure 4:
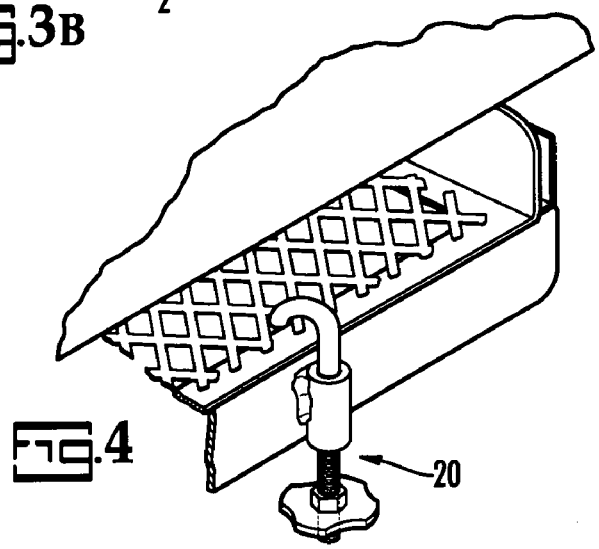
FIG. 4 shows a portion of the stored ramp with a ramp locking arm holding it in place.
Figure 5:
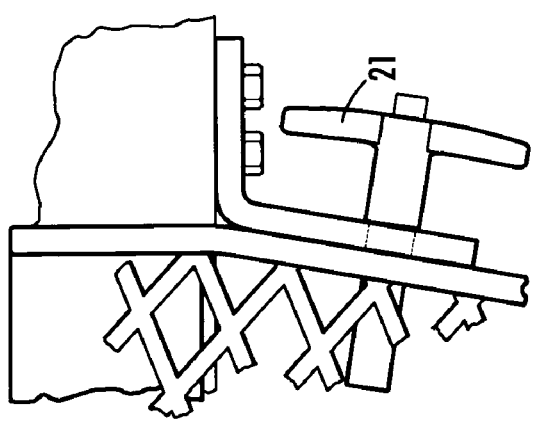
FIG. 5 shows a partial detail of the threshold ramp assembly and the locking pin in its locked position.

An additional aspect of the invention relates to how the ramp is secured to the vehicle. (See FIG. 4.) The ramp storage assembly, which is located under the current vehicle (but could be located anywhere on or in the vehicle) is specifically beneficial to medical personnel because it allows the ramp to be stored out of the way when not in use. When the ramp is needed the ramp locking arm 20 is loosened and the ramp slides out from the storage assembly and is inserted into the ramp tray receiver 29. The locking pins 21 are inserted (see FIGS. 5 and 7), and the ramp is locked in place.

The ramp assembly has an adjustable angle feature 22 that allows the ramp to be positioned on any angle level from a downward angle to an upward angle, and anywhere in between, depending on the situation the agency finds on-site. The vehicle could back up to any hospital loading dock and the ramp could be secured from the vehicle to the top of the dock platform to make loading or unloading of patients easy and safe. The vehicle could go to any on-site scene, and the ramp could be attached and lowered or raised to any ground level.

The ramp assembly can be built to larger or smaller sizes depending on the needs of the agency. The typical ramp exemplified here measures 111" long by 25⅞" wide by 6" tall. The ramp is made out of expanded steel grating 23, 3" tall ¼" flat rolled steel sides 24, 1" by ¼" round frame tubing 25, 2" by ¼" flat bar structural steel framing. All components are hot galvanized dipped to protect from rust. Other finishes and types of materials can be used to build the ramp assembly.

The size of the current ramp storage assembly size (i.e., the area where the ramp is stored when it is not in use) is an example only and the ramp receiver assembly can be built to larger or smaller sizes depending on the actual size of the ramp and the needs of the agency. The dimensions of a typical ramp receiver assembly dimensions are 120" long by 27" wide by 16¾" tall. The ramp receiver is made out of 1" by ¼" 90 degree angle steel, 2" by ¼" 90 degree angle steel, 4" by ¼" flat bar steel. All components are hot galvanized dipped to protect from rust. Other finishes and types of materials can be used to build the ramp storage assembly.

Figure 8:
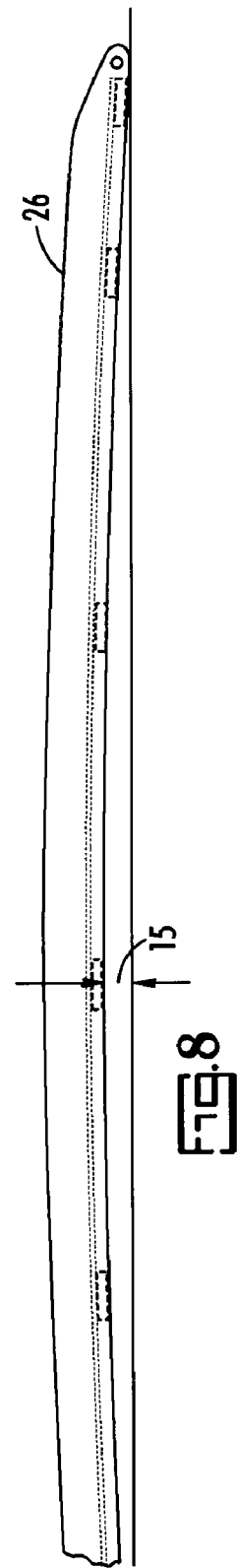
FIG. 8 shows the contour of a typical ramp.

The detachable loading/unloading ramp is specifically designed and manufactured to support a large weight load of 1,000 pounds or more. This weight load has been specifically calculated to include two caregivers carrying a stretchered patient in or out of the vehicle. Curved steel (FIG. 8) is used in the construction of the ramp for added weight capacity. The height of the side of the curved steel 26 used in the ramp structure is typically about 3". A side view of the ramp exemplified in FIG. 8 shows that the curvature 15 over the length of the ramp is 6", which indicates that the storage compartment for the ramp must, in this example, be greater than 6".

The ramp threshold assembly 27 is specifically designed to eliminate any uneven feature of a vehicle which allows an ambulance type of rolling stretcher to roll in or out of the vehicle on a smooth service as well as provide medical personnel a smooth surface to walk on while carrying a patient or victim in or out of a vehicle. The threshold ramp piece is specifically designed and manufactured to flare out to the door opening size of the vehicle and then taper down (or up) to the ramp size as it meets the ramp assembly. The threshold assembly is easily locked into place by a locking pin 28 on each side. The locking pin slides through a permanently mounted bracket and the threshold piece on each side. The threshold piece is easily removed by pulling and removing the locking pins. The threshold piece is then stored in a convenient location on the vehicle. The threshold assembly exemplified herein tapers from 26" wide at the ramp assembly to 36" wide at the door opening. The length of the threshold assembly is 17" and the height is 3". The dimensions are examples only, and the threshold assembly can be manufactured to any size depending on the vehicle being used. All components are hot galvanized dipped to protect from rust. Other finishes and types of materials can easily be used to build the threshold assembly.

Figure 6A:
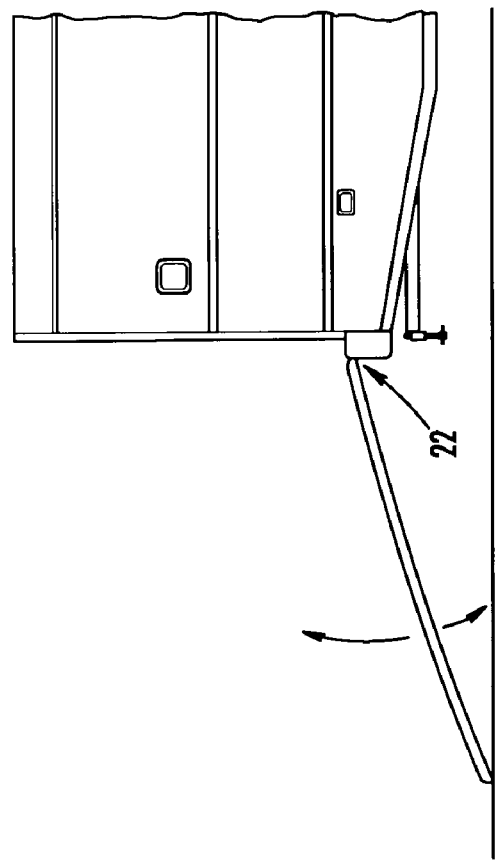
FIG. 6A shows the ramp extended from a typical vehicle, showing that the extended ramp can pivot up or down for loading at different heights around its connection point. In addition, the underfloor ramp storage assembly and the ramp locking arm assembly remain attached to the vehicle when the ramp is removed.

The ramp receiver tray assembly 29 (FIGS. 6B and 7), which mounts permanently to the vehicle is generally constructed of ⅜" steel and is power coated and painted. Preferably the receiver tray assembly contains a "U-shaped" or partial "U-shaped" component to receive the round upper end of the ramp. The receiver tray assembly measures 28" wide, 3" tall and 1½" deep. The ramp receiver tray is used to connect the ramp to the vehicle. The ramp is placed into the top of the tray assembly and, when locking pins 21 are pulled on each side, the ramp moves down into the tray and is securely locked into position. The ramp receiver tray is designed and manufactured to allow the ramp assembly to move up and down to different height levels for ease of loading patients or victims. When the ramp is no longer needed to load or unload patients or victims the ramp tray locking pins are pulled on each side and the ramp is lifted out of the tray and then stored under the vehicle. The ramp receiver assembly, like the other components of the ramp assembly, can be built to larger or smaller sizes and other materials can be used for construction (such as stainless steel and other components).

Oxygen System

Ambulances typically only provide a small amount of metered oxygen to treat one or two patients making it impossible to provide an oxygen supply for large numbers of patients on one vehicle or for a long journey. The invention allows individually metered oxygen supplies for large numbers of victims or patients during transport or for on-site care. Another problem for evacuation or medical triage personnel arises when a vehicle is needed for extended periods of time on-site to care for large numbers of victims or patients, especially when those victims or patients need individual metered oxygen supplies. Under current conditions, medical attendants and medical transportation personnel are hindered by the limited amount of oxygen available for the care of large numbers of patients.

Figure 10:
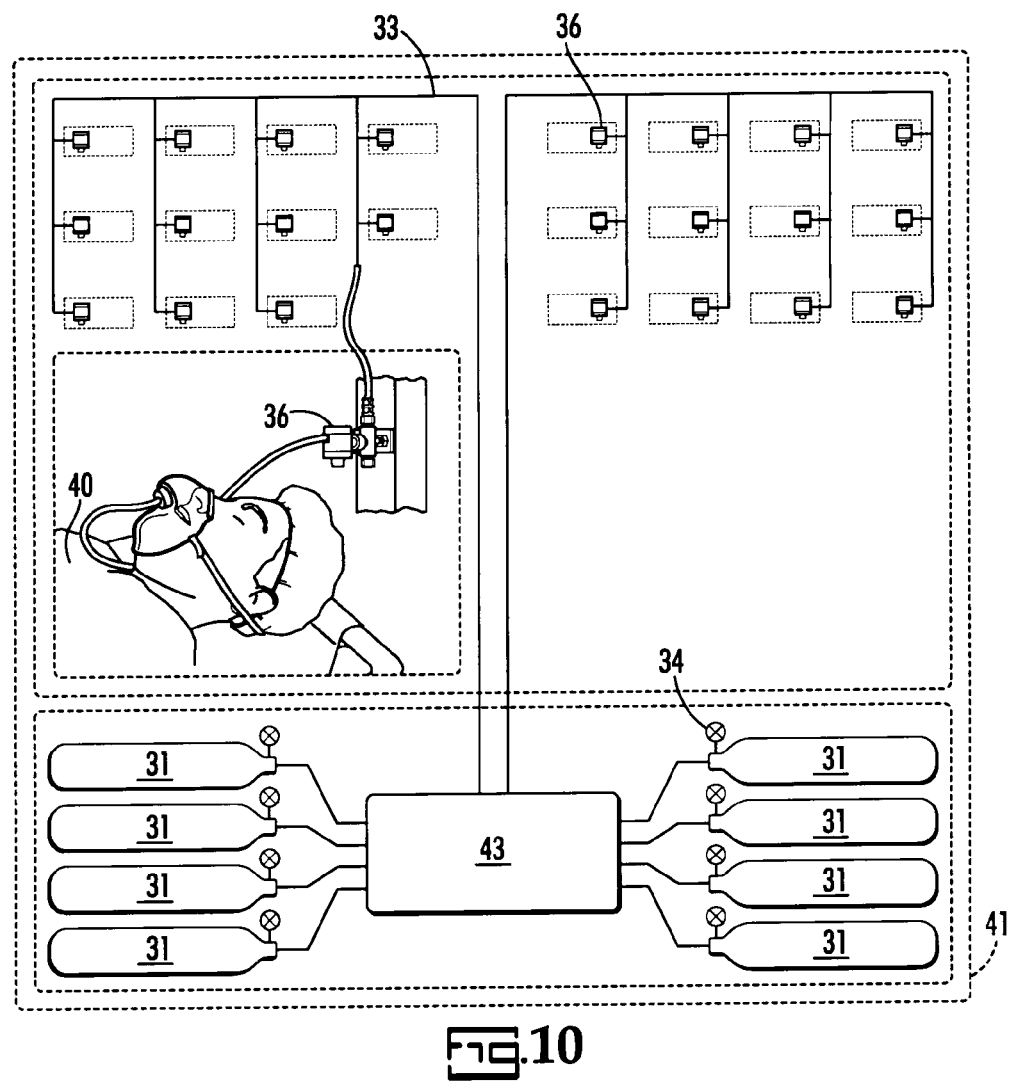
FIG. 10 shows a schematic of the oxygen system.

The oxygen system in the instant invention eliminates these disadvantages by storing and supplying a large amount of oxygen. The system supplies many hours of an individual metered oxygen supply for all of the patients needing oxygen. The invention consists, in part, of a large oxygen storage system assembly 30 (FIG. 9) and an oxygen distribution system 41 assembly (FIG. 10) to supply large numbers of victims or patients an individual metered supply of oxygen while those patients are being cared for or transported on the emergency response vehicle. The oxygen storage system, consisting of one or more oxygen tanks 31 that are secured, easily removable and replaced by medical personnel, eliminates the problem of limited oxygen supply for long periods of on-site treatment or during transportation to or from a hospital.

The oxygen distribution system distributes oxygen from the oxygen tanks 31 to the patients 40 and consists of custom designed and manufactured hoses 33, flow meters 34, and an oxygen storage and distribution control terminal 43, consisting of such components as manifolds, distribution oxygen bars, monitoring system and alarm system for high and low oxygen pressure. The system also contains an individual metered oxygen supply valve or other metering device for each patient 36 or at least some of the patients. The system as a whole is used for storing, supplying and distributing individual metered oxygen supplies to the large numbers of patents being cared for and/or transported.

The individual metered oxygen distribution system is designed to allow large numbers of patients being cared for or transported from such an incident to have individually metered oxygen supplies. The distribution system has a custom designed valve that would allow the vehicle to be parked at a hospital or other area where a main oxygen source is found and the vehicle could then be hooked up to the main oxygen supply so that the vehicle would have a sizeable supply of oxygen and, therefore, treat a large number of patients in the vehicle. The oxygen system has a custom designed emergency oxygen cut-off valve assembly that is designed to protect all medical personnel and patients in the event of an oxygen leak.

The oxygen monitoring system has been custom designed for this mass casualty vehicle. The monitoring system allows medical personnel to monitor the large supply of oxygen being stored on the vehicle and it also notifies medical personnel if there is a low or high pressure problem with the distribution system.

The oxygen storage system incorporates one or more heavy duty constructed enclosed frameworks 38 that each hold one or more large oxygen storage tanks on slide-out trays 39. Each tank is loaded into a tank cradle assembly 35 and secured tightly to the cradle by one or more (preferably two) large metal tank brackets 37. The tank tray assemblies slide in and out via a heavy duty slide mechanism 32 developed to simplify the process of changing oxygen tanks The invention also provides a secondary large oxygen backup system 42 to provide oxygen distribution in the event the primary oxygen system has a problem or runs low on oxygen.

The invention exemplified herein provides individual metered oxygen supply to twenty four patients, but the number of oxygen distribution ports can easily be increased or decreased depending on the specifics of each vehicle. The distribution system allows caregivers the flexibility to individually meter oxygen supplies to large numbers of patients.

The preferred oxygen storage tank assembly system in accordance with this invention consists of two storage boxes, each with two or more slide out oxygen tank trays 39. Each tray generally has the capacity to hold a minimum of two large oxygen cylinders 31. Such a slide out tray has at least two bolts down securement brackets 37 to keep the oxygen tanks secure during transportation. Although this exemplified system holds a supply of eight large oxygen bottles, the number and size of the oxygen storage tank assemblies can easily be increased or decreased depending on the needs of each agency. The oxygen tank storage assembly and the compartment doors are specifically built with re-enforced framing to provide impact protection in the event of a collision.

The oxygen tank regulator assembly 43 has been specifically designed and custom built to allow two separate oxygen systems, one large primary system and one large backup system. The regulator assembly has been built with a custom designed and manufactured valve which alternatively allows the oxygen storage system to connect to an external oxygen source such as a hospital or oxygen supply vehicle, and, after having connected to the exterior oxygen source, the vehicle oxygen system will have a large amount of oxygen and can stay "On Site" for an extended amount of time providing care for patients.

Stretcher System

A problem for evacuation or medical triage personnel, when confronted with a situation where large numbers of casualties or patients must be cared for or transported, is that the transport of multiple patients is limited to the number of one- or two-patient ambulances available. In addition, patients on stretchers who are in a stacked position, which is the case when loop-type straps such as those used on military air evacuation planes, have a possibility of being dropped on another patient.

A stretcher receiving assembly, in accordance with the invention, eliminates these disadvantages by allowing a large number of patients to be treated and transported and by allowing the caregivers the flexibility to stack stretchered patients two, three or more high in a vehicle for treatment and/or transport. The stretcher receiving assembly can be in various forms, for example a sliding stretcher receiver device, a mechanism comprising ball bearings on which the stretch slides, a bunk bed or tray style of bed. An additional version or an optional component of the assembly is a tray that is capable of collecting and/or draining fluids.

Figure 11A:
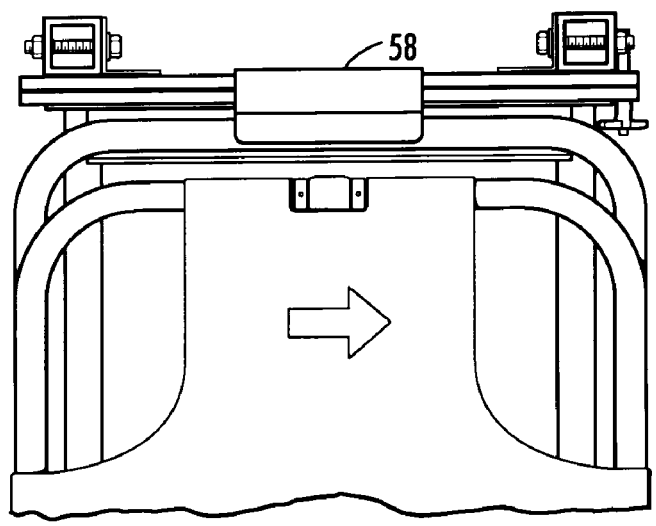
FIGS. 11 A, B and C show detail for one version of the sliding stretcher storage system.
Figure 11B:
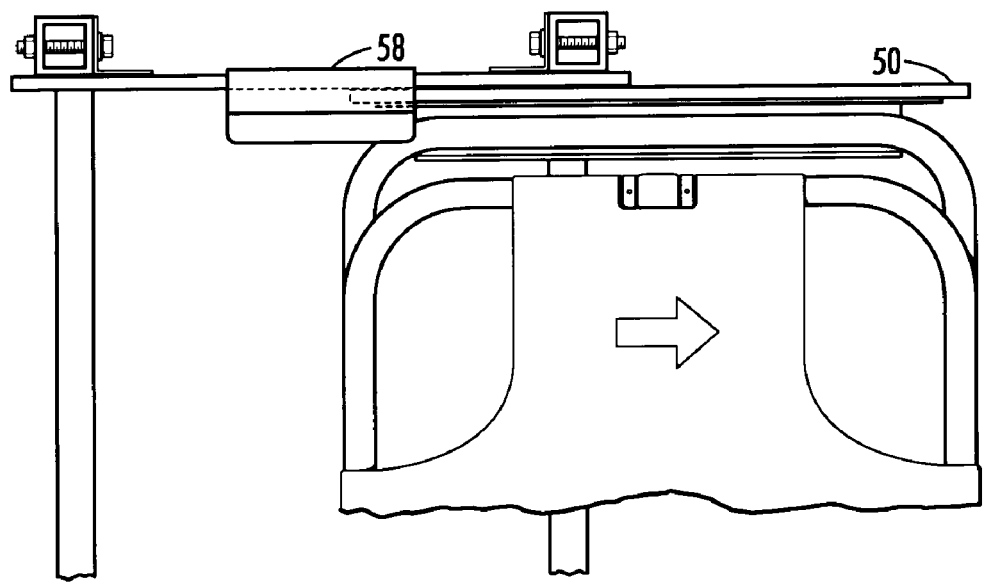
Figure 11C:
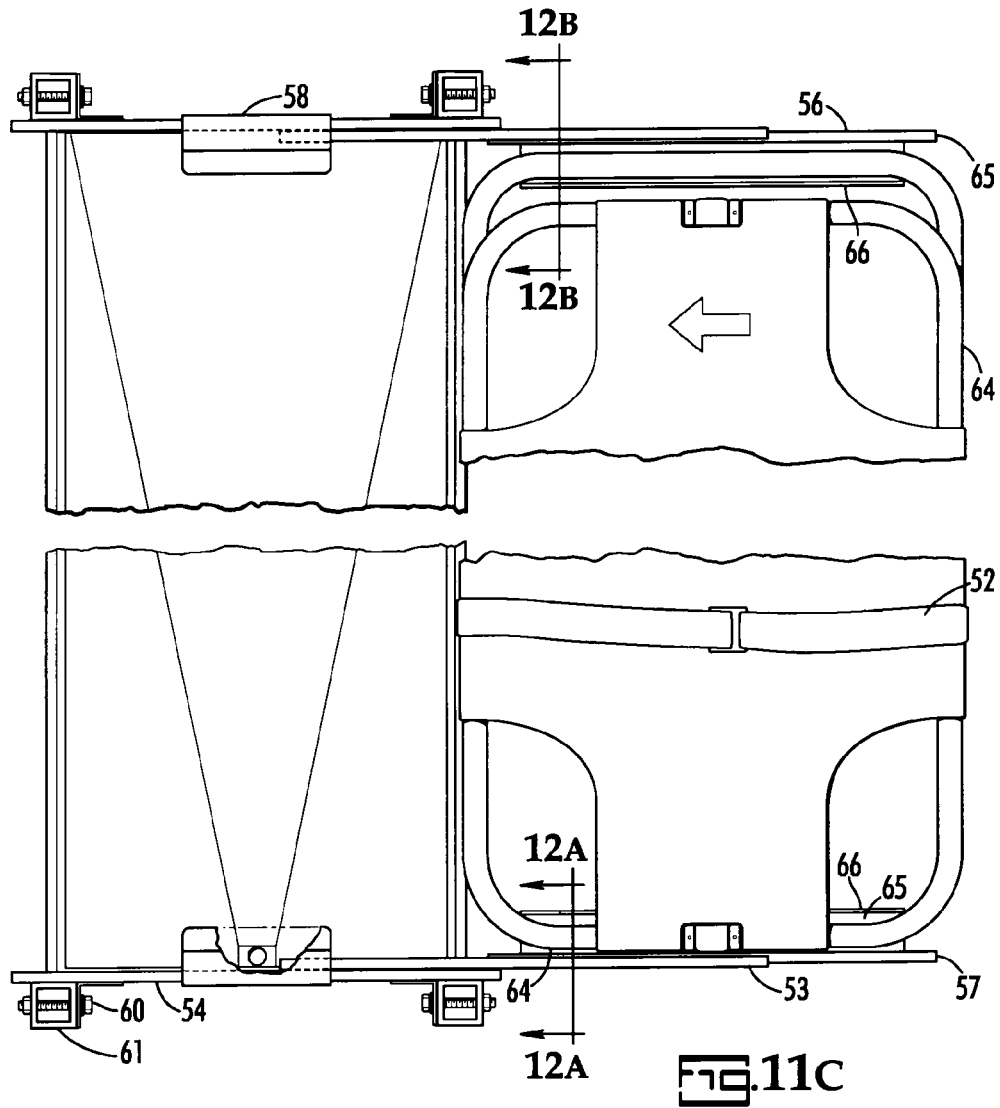

An example of the sliding stretcher receiver device is shown in FIGS. 11 A, B and C. The device specifically allows the stretchers to be loaded into the extended stretcher slide 50 and then slid under/above another patient. The stretcher slide has a vertical travel eliminator (58 in FIGS. 11A, B and C) that keeps the stretcher from becoming dislodged for any reason. The stretcher receiver also has a horizontal locking device (51 in FIGS. 14 A, B and C) that eliminates movement of the stretcher after the patient has been placed in the treatment or transport position. The stretcher receiver can be built to accommodate all sizes and types of stretchers or other forms of patient transport (e.g., military type stretcher with wooden handles). The stretcher receiver can be manufactured from a wide variety of materials including but not limited to stainless steel, steel, aluminum, or any other suitable material that has the required strength. The stretcher normally has one or more patient securement straps or seat belts 52 to securely hold the patient during transport.

Figure 13A:
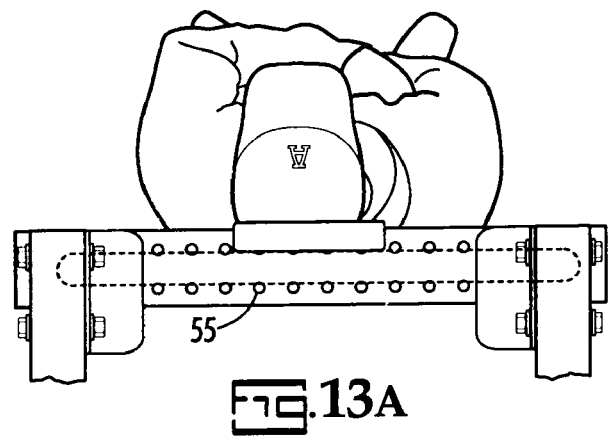
FIGS. 13 A, B and C show the operational features of the sliding stretcher assembly, an alternate stretcher storage system.
Figure 13B:
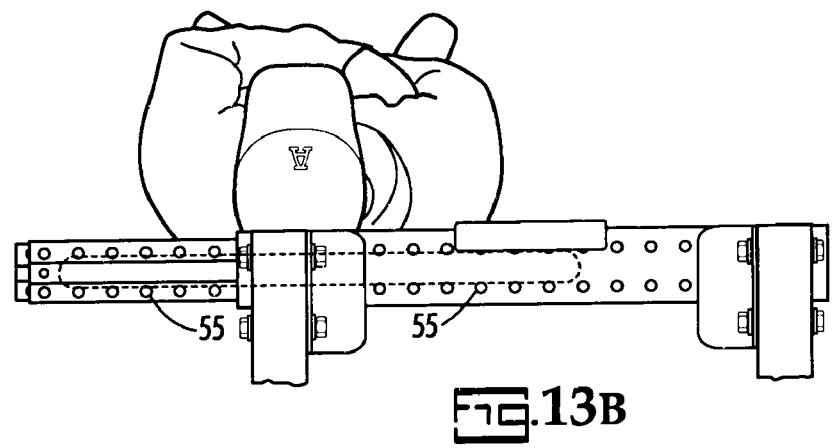
Figure 13C:
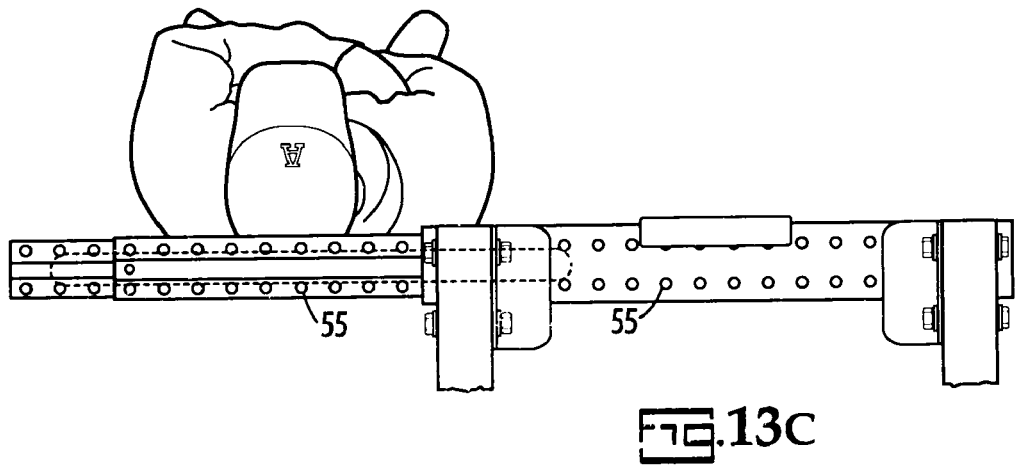
Figure 14A:
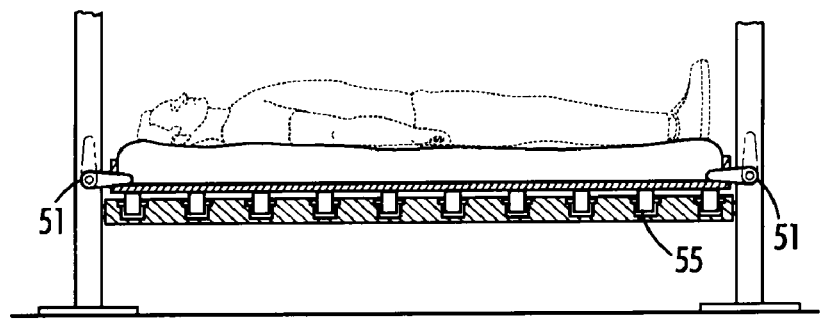
FIGS. 14 A, B and C show variations in the roller and locking systems used for loading the stretchers when sliding stretchers are not used.
Figures 14B, 14C:
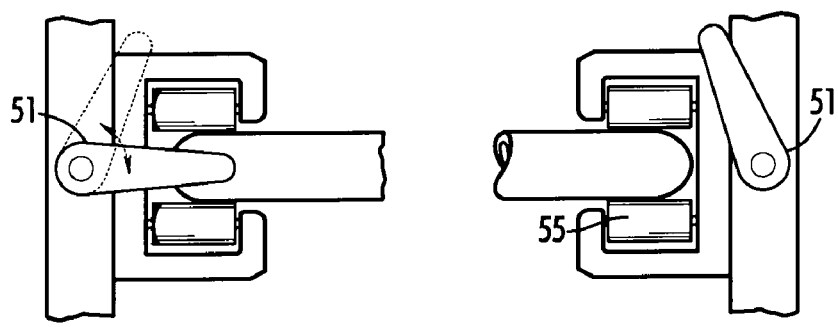

Several alternative stretcher systems are shown in FIGS. 11 and 13. The first (FIG. 11) shows a stretcher support 53 that extends from the frame 54. The second (FIG. 13) shows a system in which the stretcher moves on rollers 55. The roller system can involve movement of the body of the stretcher itself on rollers (FIG. 14A), or the top and bottom of the stretcher can be in contact with the rollers (FIGS. 14 B and C). Other roller systems can also be utilized.

The sliding stretcher receivers are typically constructed from zinc plated cold rolled 14 ga steel, but are also available in other materials such as stainless steel, aluminum and other manufactured materials. Each slide is usually rated at 550 pounds, but other weight capacities are easily built. The slides frequently have ball bearings to provide quiet and smooth operation. Other types of components available for the slides are wheels that are constructed out of rubber, nylon, steel or other manufactured materials.

Figure 12A:
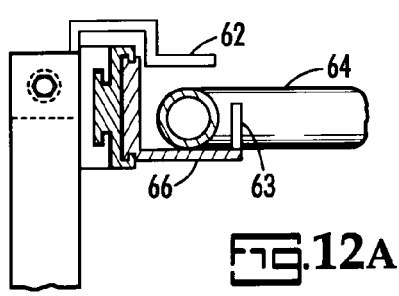
FIGS. 12 A and B show detail of the stretcher loaded into position in the connection of the stretcher shown in FIG. 11 to the sliding stretcher support.
Figure 12B:
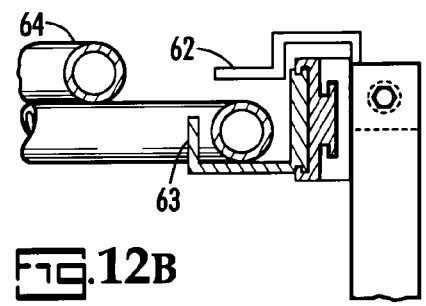

In the locked transport position, the typical stretcher receiver assembly is approximately 20" deep by 78" long. In the loading/extended position, the stretcher receiver assembly slides out to the fully open position of 41" deep. However, the slide can be built in many different sizes. The stretcher receiver tray foot 56 and head 57 are often constructed from 11 ga steel but can be built with other materials like stainless steel, aluminum or other manufactured materials. The receiver trays are welded to the stationary side of the stretcher receiver. Two corner support brace brackets can be made from ⅛" steel, 2"×4", but a wide variety of other materials may be used such as stainless steel, aluminum, or other manufactured materials. The corner support brace brackets are welded to the stationary side of the stretcher receiver. The entire stretcher assemblies are bolted 60 to the vertical support tubing 61. The vertical support tubing can be constructed from any material including wood, aluminum, steel, stainless steel or any other material. The stretcher receiver can be mounted to a stationary wall instead of tubular support tubing. The locking pin assembly 51 is then connected to the stretcher receiver to eliminate any horizontal movement of the stretchered patient. Note that the type of construction for the stretcher utilized in FIG. 11 requires an opening 65 in the side of the support bracket 66 so that the stretcher can be placed into, and removed from, the receivers. In addition, at one end (FIG. 12A), space must be allowed for the fabric used in the stretcher to pass between the sides of the support bracket (62 and 63) and be wrapped around the tubular support 64.

One variation of the stretcher system does not incorporate the "slide out" portion of the slide described previously. The alternate mechanism (FIG. 14) allows the stretcher to slide into a channel type of receiver that has ball bearing wheels or a set of rollers/wheels along the bottom and/or top of the assembly. The ball bearings/rollers/wheels allow the stretcher to slide back into the locking position (the benefit here is that the sliding stretcher arms do not have to extend out into the aisle). Once the stretcher has been slid into place, a locking bar 51 slides down to keep the stretcher from sliding back out.

Figure 15:
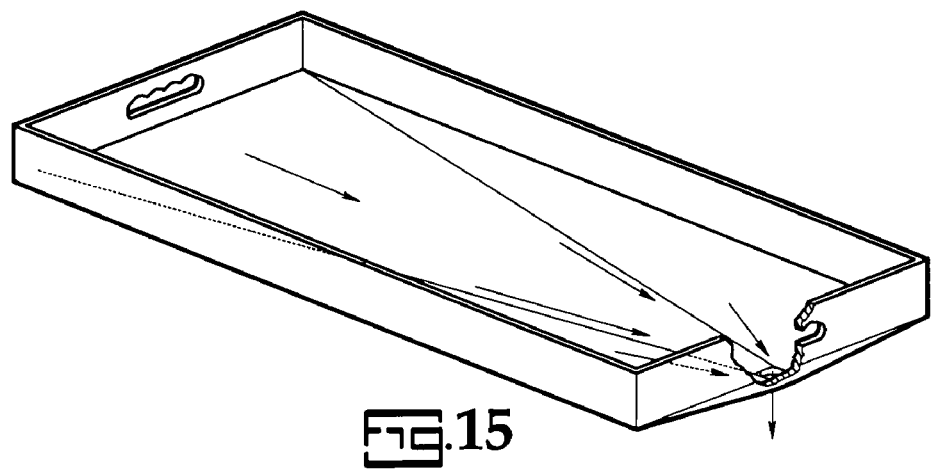
FIG. 15 shows the stretcher tray assembly, which collects bodily fluids and prevents them from dripping on another patient. The tray assembly has a drain connection which allows for the removal of bodily fluids from a stretcher or cleaning products used to clean the trays.

Another variation is a bunk bed type or tray style of bed, typically made of aluminum or stainless steel that is connected to the slide out tray arms (FIG. 15). This "bed type" patient area is needed to eliminate the possibility of body fluids flowing down on patients below. The standard stretchers are set down into the tray assembly and are held in place by the same vertical and horizontal safety braces described above. The beds have, for example, a vinyl type bed mattress or mattress cover, and the tray slopes to a connection, typically in the center or on one end of the tray, for a hose connection that would be used to drain away fluids or cleaning agents used to clean the mattresses.

Figure 17:
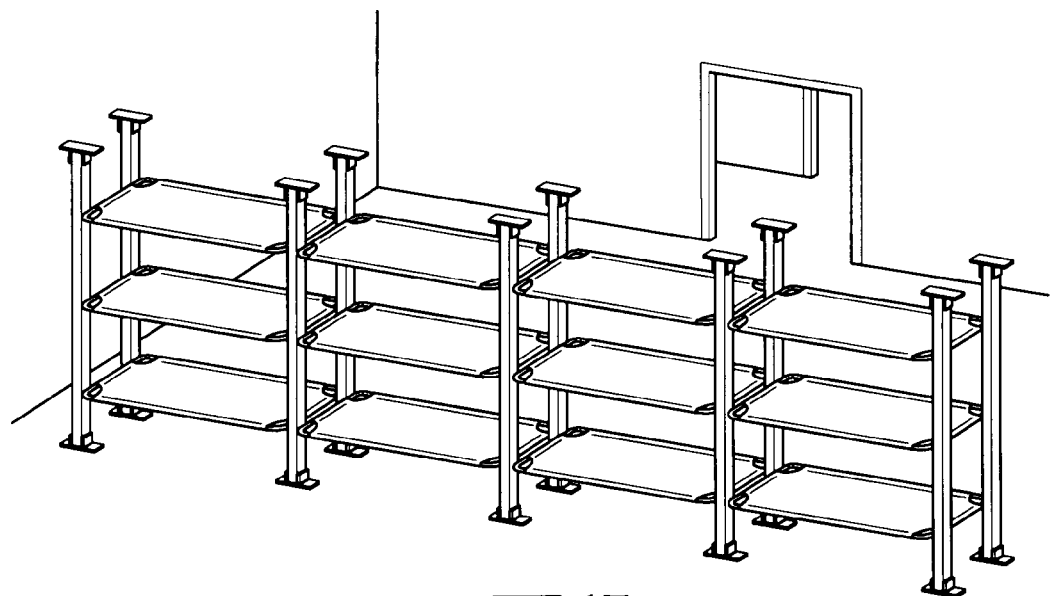
FIG. 17 shows a stretcher system that formerly was in an evacuation vehicle, but which has been reassembled in an emergency facility.

A further variation is a stacked stretcher system that can be quickly assembled, said system capable of being easily lengthened from one to three or to as many assemblies as space allows. A combination of sliding stretcher assemblies, non-sliding stretcher assemblies and bed type patient trays assemblies can be assembled within the same configuration, using either a sliding or non-sliding type assembly (similar to that in FIG. 17, except assembled in an evacuation vehicle), showing a single stacked stretcher assembly and set of four stacked stretcher assemblies connected to one another.

Another variation relates to the location in which the stacked stretcher assemblies can be assembled and used. The assembly is conducive to being rapidly assembled inside a building, such as a school gymnasium or other public area, for example an arena, a tent or other building where people would go when an evacuation is ordered (e.g., during a national disaster). The design for the stretcher assembly allows for rapid deployment from one place to another place as well as rapid dis-assembly from the vehicle and assembly in the emergency location (e.g., school gymnasium). The benefit of this system is that two or three times as many people could be housed in the same floor area vs. an unstacked stretcher system. When a disaster threatens or takes place, only a small amount of space is sometimes available for large numbers of evacuees or displaced people. The stacking stretcher/bed assemblies allow more people to stay in the same amount of space.

Other Variations

The vehicle can also be used to transport victims from a mass-casualty incident. As such, the vehicle could serve as a multiple victim transport or mortuary storage vehicle. In this variation, the refrigeration system or air conditioning system would be modified to maintain the interior of the vehicle at a maximum temperature of approximately 40 degrees F. A refrigeration unit, such as one made by Thermo King (e.g., Model MD-100) or Carrier (e.g., Model Supra 550) might be used to maintain the temperature. Such a vehicle might utilize other variations of the accessories described previously, such as a different stretcher stacking system (less space between stretchers would allow for additional victims). A wider ramp might be used, and the rear door might be folded down to become the ramp. As discussed previously, the mortuary vehicle could be built into any one of the several vehicles contemplated (e.g., a bus, trailer, truck body, etc.). This vehicle could also be used to store bodies over an extended period until autopsies or burial can be scheduled. The refrigeration unit can be powered by, for example, a diesel engine or by electricity (e.g., plugged into an electrical outlet), either of which would allow the mortuary vehicle to remain on site and store victims for an extended length of time.

Figure 16:
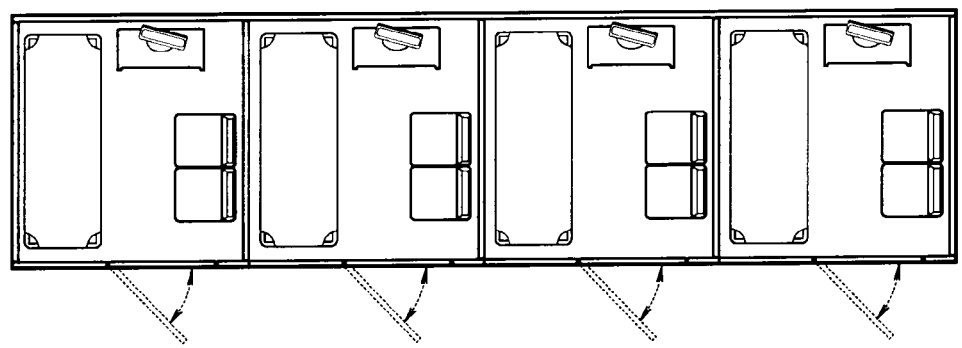
FIG. 16 shows an example of a portion of a vehicle with quarantine or isolation units.

A further variation relates to the use of a multiple emergency response vehicle equipped with individual isolation or quarantine rooms as an isolation or quarantine unit for (a) treating patients suffering from a highly communicable disease or (b) for isolating the patients until the incubation period has passed in order to determine if the individuals are infected (e.g., at a border entry point). (See FIG. 16)

The particular vehicle used to construct the examples described above was a bus, specifically a Thomas Built front engine bus with a rear loading/unloading door. All components shown were custom designed and manufactured to meet the exact needs of this particular vehicle. All components designed and manufactured are easily manufactured in different sizes and with different types of materials. The custom designed evacuation/triage interior and exterior features can also be installed in any other vehicle including, but not limited to, other buses, planes, trucks, trains, trailers, ships, subways or any other mode of transportation.

The vehicle can also optionally contain other components that might be useful in an emergency vehicle, such as the following:
- emergency lighting and siren systems for emergency response vehicles,
- rear loading and unloading lights to assist medical personnel when loading and unloading in a dark area, exterior side lighting to illuminate a scene around the vehicle, a nurse's station, medical equipment storage drawers, refrigerator, medical monitoring equipment, electrical outlets for medical equipment operation, extended rear opening door to allow stretcher bearers more headroom when entering or exiting the vehicle,
- interior florescent lighting,
- a custom installed germ free floor covering,
- a master battery cutoff switch conveniently located near the driver,
- an emergency oxygen cutoff valve located near the driver and the front entrance door,
- attendant seats with restraining belts (Other attendants could stand and hold on to the front to rear grab rails mounted to the ceiling.),
- rooftop heating and air conditioning systems (The example described herein has three such systems.),
- a fuel tank (the example herein contained 100 gallons) which allows the vehicle to travel long distances or stay at the same location for long periods of time,
- is built to drive on any road or any firm level non-road ground situation, and
- can be loaded into a large airplane cargo area and transported by air to any location in the world.

The invention also relates to the transport, treatment or accommodation of multiple victims using the vehicle described above.

It will be recognized by those with ordinary skill in this area that further variations of the above described emergency response vehicle are within the scope of the disclosed invention.

We claim:

1. A transportable emergency response station for the treatment or transportation of quarantined, injured or deceased persons on stretchers, each stretcher having a major dimension extending between opposite ends of the stretcher, and a minor dimension that extends crosswise to the major dimension and is smaller than the major dimension, the station comprising:
    an interior compartment;
    a frame fixedly positioned in the interior compartment; and
    a plurality of vertically stacked stretcher receiver assemblies positioned in the interior compartment, the plurality of vertically stacked stretcher receiver assemblies comprising a stretcher receiver assembly for removably receiving and supporting a stretcher supporting a person, the stretcher receiver assembly comprising
        first and second receivers that are spaced apart from one another in a longitudinal direction that extends horizontally, each of the first and second receivers comprising a translatable portion, the translatable portions being configured for respectively receiving the opposite ends of the stretcher so that the major dimension of the stretcher extends in the longitudinal direction,
        a support assembly carried by the frame and movably supporting the translatable portions so that the translatable portions are for guiding the stretcher in a lateral direction between extended and retracted positions that are horizontally coplanar, the lateral direction extending horizontally and crosswise to the longitudinal direction, and maximal elevation of the support assembly being the same in the extended and retracted positions; and
    the station further comprises a catch tray, positioned to catch fluids or other foreign objects falling from a stretcher, or person thereon, received above the tray, the catch tray being spaced from the stretcher.

2. The station according to claim 1, wherein:
    the stretcher receiver assembly is a first stretcher receiver assembly;
    the plurality of vertically stacked, stretcher receiver assemblies comprises a second stretcher receiver assembly positioned beneath the first stretcher receiver assembly; and
    the catch tray is positioned so that fluids or other foreign objects falling from proximate the first stretcher receiver assembly are caught by the catch tray before reaching a person supported by a stretcher supported by the second stretcher receiver assembly.

3. The station according to claim 1, wherein the stretcher receiver assembly includes a restricting device for selectively restricting movement of the stretcher in the lateral direction, from the retracted position, to the extended position.

4. The station according to claim 1, wherein the stretcher receiver assembly includes a restricting device for selectively restricting upward movement of the stretcher.

5. The station according to claim 1, wherein the station is a vehicle configured for traveling in the longitudinal direction.

6. The station according to claim 1, wherein the frame is: for being removed, from the compartment, and for thereafter being assembled outside of the compartment.

7. The station according to claim 1, wherein for each receiver of the first and second receivers, the translatable portion comprises at least one support bracket for receiving and supporting a respective portion of the stretcher so that the stretcher moves with the translatable portion relative to the frame portion in the lateral direction between the extended and retracted positions.

8. The station according to claim 7, wherein for each receiver of the first and second receivers, the support bracket is configured for:
    receiving the respective portion of the stretcher while the translatable portion is in the extended position; and
    retaining the respective portion of the stretcher while the translatable portion is in the retracted, position.

9. The station according to claim 8, wherein for each receiver of the first and second receivers:
the support bracket is an upwardly open channel for having the respective portion of the stretcher lowered thereinto while the translatable portion is in the extended position, and
the opening of the channel is obstructed while the translatable portion is in the retracted position, for retaining the respective portion of the stretcher in the channel while the translatable portion is in the retracted position.

10. A transportable emergency response station for the treatment or transportation of quarantined, injured or deceased persons on stretchers, each stretcher having a major dimension, extending between opposite ends of the stretcher, and a minor dimension that extends crosswise to the major dimension and is smaller than the major dimension, the station comprising:
an interior compartment; and
a plurality of vertically stacked stretcher receiver assemblies positioned in the interior compartment, the plurality of vertically stacked stretcher receiver assemblies comprising a stretcher receiver assembly for removably receiving and supporting a stretcher supporting a person, the stretcher receiver assembly comprising first and second receivers that are spaced apart from one another in a longitudinal direction that extends horizontally, the opposite ends of the stretcher being releasably secured within the first and second receivers so that the major dimension of the stretcher extends in the longitudinal direction, each of the first and second receivers comprising a plurality of roller mechanisms, the first and second receivers being cooperatively configured for guiding the stretcher in a lateral, direction between extended and retracted positions that are horizontally coplanar, and the lateral direction extending horizontally and crosswise to the longitudinal direction;
wherein for each receiver of the first and second receivers:
the receiver comprises a frame portion and a movable portion, the plurality of roller mechanisms of the receiver are positioned between the frame portion and the movable portion, and, the movable portion is for being moved relative to the frame portion in the lateral direction between the extended and retracted positions,
wherein the plurality of roller mechanisms for each receiver further comprises a first set of roller mechanisms and a second set of roller mechanisms, wherein, the first set is located above the movable portion, and the second set is located below the movable portion.

11. The station according to claim 10, wherein the station is a vehicle configured for traveling in the longitudinal direction.

12. The station according to claim 10, wherein the stretcher receiver assembly includes a restricting device for selectively restricting movement of the stretcher in the lateral direction from the retracted position to the extended position.

13. The station according to claim 10, wherein the stretcher receiver assembly includes a restricting device for selectively restricting upward movement of the stretcher.

14. The station according to claim 10, wherein:
the stretcher receiver assembly is a first stretcher receiver assembly;
the plurality of vertically stacked stretcher receiver assemblies comprises a second, stretcher receiver assembly positioned beneath the first stretcher receiver assembly; and
the station further comprises a catch tray so that fluids or other foreign objects falling from proximate the first stretcher receiver assembly are caught by the catch tray before reaching a person supported by a stretcher supported by the second stretcher receiver assembly.

15. The station according to claim 10, wherein the first and second sets of roller mechanisms are selected from the group consisting of ball bearings, rollers and wheels.

16. The station according to claim 10, wherein for each receiver of the first and second receivers:
the movable portion comprises at least one support bracket for receiving and supporting a respective portion of the stretcher so that the stretcher moves with the movable portion relative to the frame portion in the lateral direction, between the extended and retracted positions.

17. The station according to claim 16, wherein the stretcher receiver assembly includes a restricting device for selectively restricting movement of the stretcher in the lateral direction from the retracted position to the extended position.

18. The station according to claim 16, wherein the stretcher receiver assembly includes a restricting device for selectively restricting upward movement of the stretcher.

19. The station according to claim 16, wherein the frame portions are part of a frame that is mounted to and extends from a floor of the compartment.

20. The station according to claim 16, wherein the frame portions are part of a frame that is removably mounted to the compartment, so that the frame is:
for being removed from the compartment, and
for thereafter being assembled outside of the compartment.

21. The station according to claim 16, wherein for each receiver of the first and second receivers, the support bracket is configured for:
receiving the respective portion of the stretcher while the movable portion is in the extended position; and
retaining the respective portion of the stretcher while the movable portion is in the retracted position.

22. The station according to claim 21, wherein for each receiver of the first and second receivers:
the support bracket is an upwardly open channel for having the respective portion of the stretcher lowered thereinto while the movable portion is in the extended position, and
the opening of the channel is obstructed while the movable portion is in the retracted position, for retaining the respective portion of the stretcher in the channel while the movable portion is in the retracted position.

23. A transportable emergency response station for the treatment or transportation of quarantined, injured or deceased, persons on stretchers, the station being configured for traveling in a longitudinal direction, and, the station comprising:
an interior compartment;
a support frame positioned in the interior compartment;
a plurality of vertically stacked stretcher receiver assemblies that are supported by the frame, wherein
a receiver assembly of the plurality of vertically stacked, stretcher receiver assemblies is for removably receiving and supporting a stretcher supporting a person,
the receiver assembly is at least partially supported by a plurality of roller mechanisms so that the receiver assembly is movable relative to the frame in a lateral direction that extends horizontally and crosswise to the longitudinal direction, between a retracted position and an extended position that are horizontally coplanar,
the receiver assembly is for receiving the stretcher supporting the person while the receiver assembly is in the extended position, and the receiver assembly is for carrying the stretcher supporting the person from the extended position to the retracted position;

wherein the receiver assembly comprises first anal second receivers the first and second receivers are spaced apart from one another in, the longitudinal direction, each of the first and second receivers extend in the lateral direction, and the opposite ends of the stretcher are releasably, secured within the first and second receivers for together carrying the stretcher in the lateral direction between the extended and retracted positions;

wherein for each receiver of the first and second receivers:
the receiver comprises a movable portion and a portion of the plurality of roller mechanisms,
wherein each portion of roller mechanisms comprises a first set of roller mechanisms and a second set of roller mechanisms, wherein the first set is located above the movable portion and the second, set is located below the movable portion.

24. The station according to claim 23, wherein the plurality of roller mechanisms are selected from the group consisting of ball bearings, rollers and wheels.

25. The station according to claim 23, wherein the station is a vehicle configured for traveling in the longitudinal direction.

26. The station according to claim 23, wherein for each receiver of the first and second receivers:
the movable portion comprises at least one support bracket for receiving and supporting a respective portion of the stretcher so that the stretcher moves with the movable portion relative to the frame in the lateral direction between the extended and retracted positions.

27. The station according to claim 26, comprising a restricting device for selectively restricting movement of the stretcher in the lateral direction from the retracted position to the extended position.

28. The station according to claim 26, comprising a restricting device for selectively restricting upward movement of the stretcher relative to the receiver assembly.

29. The station according to claim 26, wherein for each receiver of the first and second receivers:
the support bracket is an upwardly open channel for having the respective portion of the stretcher lowered thereinto while the movable portion is in the extended position, and
the opening of the channel is obstructed while the movable portion is in the retracted position, for retaining the respective portion of the stretcher in the channel while the movable portion is in the retracted position.

30. The station according to claim 26, wherein the frame is mounted to and extends from a floor of the compartment.

31. A transportable emergency response station for the treatment or transportation of quarantined, injured or deceased persons on stretchers, the station comprising:
an interior compartment;
a support frame positioned in the interior compartment;
a plurality of vertically stacked stretcher receiver assemblies that are supported by the frame, a stretcher receiver assembly of the plurality of vertically stacked stretcher receiver assemblies comprising first and second receivers that are spaced apart from one another, opposite ends of a stretcher are releasably secured within the respective first and second receivers, wherein for each receiver of the first and second receivers:
the receiver comprises a movable portion mounted to the frame for being moved horizontally relative to the frame between retracted and extended positions that are horizontally coplanar,
the movable portion comprises at least one support bracket for receiving and supporting a respective portion of the stretcher so that the stretcher moves horizontally with the movable portion relative to the frame between the extended and retracted positions,
the at least one support bracket at least partially defines an upwardly open opening for having the respective portion of the stretcher lowered thereinto, and
the stretcher receiver assembly comprises structure for obstructing the opening for retaining the respective portion of the stretcher upon the at least one support bracket;
the receiver comprising a first plurality of roller mechanisms positioned above a second plurality of roller mechanisms,
wherein at least part of the movable portion is received between the first plurality and the second plurality of roller mechanisms.

32. The station according to claim 31, wherein:
the stretcher receiver assembly is a first stretcher receiver assembly;
the plurality of vertically stacked stretcher receiver assemblies comprises a second stretcher receiver assembly positioned beneath the first stretcher receiver assembly; and
the station further comprises a catch tray positioned so that fluids or other foreign objects falling from proximate the first stretcher receiver assembly are caught by the catch, tray before reaching a person supported by a stretcher supported by the second stretcher receiver assembly.

33. A method of treating or transporting quarantined, injured or deceased persons, comprising:
loading a stretcher, which is supporting a person, into an transportable emergency response station containing a plurality of vertically stacked stretcher receiver assemblies, wherein the stretcher has a major dimension extending between opposite ends of the stretcher, and a minor dimension that extends crosswise to the major dimension and is smaller than the major dimension;
moving a receiver assembly of the plurality of vertically stacked stretcher receiver assemblies in a lateral direction that extends horizontally, from a retracted position to an extended position, wherein the retracted position and the extended position are horizontally coplanar, and a longitudinal direction extends horizontally and crosswise to the lateral, direction;
releasably securing the stretcher, which is supporting the person, upon within the receiver assembly while the receiver assembly is in the extended position, so that the receiver assembly supports the stretcher while the receiver assembly is in the extended position, and the major dimension of stretcher extends in the longitudinal direction; and
moving the receiver assembly together with the stretcher, which is supporting the person, in the lateral direction from the extended position to the retracted position while
the receiver assembly supports the stretcher and the stretcher supports the person, and
the major dimension of the stretcher extends in the longitudinal direction, wherein the receiver assembly is at least partially supported by a plurality of roller mechanisms, the plurality of roller mechanisms comprising, at least a first plurality of roller mechanisms positioned above a second plurality of roller mechanisms, wherein at least part of the receiver assembly is received between the first plurality and the second plurality of roller mechanisms, so that the moving steps are at least partially facilitated by the plurality of roller mechanisms.

34. The method of claim 33, further comprising moving the station in the longitudinal direction while:

the receiver assembly is supporting the stretcher, which is supporting the person, in the retracted position, and the major dimension of the stretcher extends in the longitudinal direction.

35. The method of claim 33, wherein:

the moving of the receiver assembly from the retracted position to the extended, position comprises moving first and second receivers of the receiver assembly in the lateral direction from the retracted position to the extended position;

the releasably securing of the stretcher comprises engaging the opposite ends of the stretcher respectively within the first and second receivers while the first and second receivers are in the extended position, so that the first and second receivers respectively support the opposite ends of the stretcher while the first and second, receivers are in the extended position; and the moving of the receiver assembly together with the stretcher comprises moving the first and second receivers together with the stretcher in, the lateral direction from the extended position to the retracted position while the first and second receivers respectively support the opposite ends of the stretcher.

36. The method of claim 33, further comprising securing the stretcher from at least one movement selected from the group consisting of horizontal movement and upward movement.

37. The method of claim 33, further comprising providing a catch tray below the stretcher.

38. The method of claim 33, wherein the moving steps comprise moving the receiver assembly upon the plurality of roller mechanisms.

39. The method of claim 38, wherein the roller mechanisms are selected from the group consisting of ball bearings, rollers and wheels.

* * * * *

UNITED STATES PATENT AND TRADEMARK OFFICE
CERTIFICATE OF CORRECTION

PATENT NO.        : 8,366,167 B2
APPLICATION NO.   : 13/357672
DATED             : February 5, 2013
INVENTOR(S)       : Edward Lewis Sartin and Edward Austin Sartin It is certified that error appears in the above-identified patent and that said Letters Patent is hereby corrected as shown below:

In Claim 1, Column 12, line 24, the following words should be inserted after the word "catch": --and configured to contain--.

Signed and Sealed this
Sixteenth Day of April, 2013

Teresa Stanek Rea
*Acting Director of the United States Patent and Trademark Office*